(12) United States Patent
Lin (10) Patent No.: US 11,892,729 B2
(45) Date of Patent: Feb. 6, 2024

(54) BACKLIGHT MODULE AND DISPLAY DEVICE

(71) Applicants: K-Tronics (Suzhou) Technology Co., Ltd., Jiangsu (CN); BOE TECHNOLOGY GROUP CO., LTD., Beijing (CN)

(72) Inventor: Ronghui Lin, Beijing (CN)

(73) Assignees: K-Tronics (Suzhou) Technology Co., Ltd., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 486 days.

(21) Appl. No.: 17/051,866

(22) PCT Filed: Dec. 16, 2019

(86) PCT No.: PCT/CN2019/125673
§ 371 (c)(1),
(2) Date: Oct. 30, 2020

(87) PCT Pub. No.: WO2021/119927
PCT Pub. Date: Jun. 24, 2021

(65) Prior Publication Data
US 2023/0115518 A1    Apr. 13, 2023

(51) Int. Cl.
*G02F 1/13357*    (2006.01)
*G02F 1/1333*    (2006.01)

(52) U.S. Cl.
CPC .. *G02F 1/133608* (2013.01); *G02F 1/133314* (2021.01); *G02F 1/133317* (2021.01); *G02F 1/133606* (2013.01)

(58) Field of Classification Search
None
See application file for complete search history.

(56) References Cited

U.S. PATENT DOCUMENTS

| 7,656,470 B2 * | 2/2010 | Yu | G02F 1/133308 362/628 |
| 7,764,335 B2 * | 7/2010 | Tanaka | G02F 1/133608 362/610 |

(Continued)

FOREIGN PATENT DOCUMENTS

| CN | 101025507 A | 8/2007 |
| CN | 102352986 A | 2/2012 |

(Continued)

*Primary Examiner* — Richard H Kim
(74) *Attorney, Agent, or Firm* — HOUTTEMAN LAW LLC (57) ABSTRACT

Embodiments of the present disclosure provide a backlight module and a display device. The backlight module includes: a backplane, a bezel, a protrusion and a plurality of dimming film layers, wherein the bezel is connected to the backplane and includes: a fixing structure and a plurality of bezel sidewalls on which the fixing structure is disposed, the fixing structure has an orthographic projection on the backplane located within an orthographic projection of the bezel sidewalls on the backplane, the plurality of bezel sidewalls and the backplane define an accommodation space in which the dimming film layers are provided, and the protrusion is fixedly disposed on a side surface of at least one of the dimming film layers and fixed to the bezel sidewalls via the fixing structure.

13 Claims, 7 Drawing Sheets

(56) References Cited

U.S. PATENT DOCUMENTS

2007/0195223 A1     8/2007   Nishiyama et al.
2016/0305459 A1* 10/2016   Park ........................ F24S 25/61

FOREIGN PATENT DOCUMENTS

| CN | 102798033 A | 11/2012 |
| CN | 108319056 A | 7/2018 |
| CN | 208607460 U | 3/2019 |
| JP | 2004219838 A | 8/2004 |

\* cited by examiner

FIG. 9

BACKLIGHT MODULE AND DISPLAY DEVICE

CROSS-REFERENCE TO RELATED APPLICATIONS

This application is a National Phase Application filed under 35 U.S.C. 371 as a national stage of PCT/CN2019/125673, filed on Dec. 16, 2019.

TECHNICAL FIELD

The present disclosure relates to the field of display technologies, and particularly relates to a backlight module and a display device.

BACKGROUND

With the development of display technologies, display devices such as televisions and displays are developed towards ultra-thin, narrow-bezel, bezel-less, high brightness, high contrast, and low power consumption. In order to meet these technical trends, the internal structure of the device is required to be more compact, and the films in the backlight module are required to keep stable during use and transportation.

SUMMARY

To solve at least one of the problems in the related art, the present disclosure provides a backlight module and a display device.

The present disclosure provides a backlight module, including: a backplane, a bezel, a protrusion and a plurality of dimming film layers, wherein the bezel is connected to the backplane and includes: a fixing structure and a plurality of bezel sidewalls on which the fixing structure is disposed, the fixing structure has an orthographic projection on the backplane located within an orthographic projection of the bezel sidewalls on the backplane, the plurality of bezel sidewalls and the backplane define an accommodation space in which the dimming film layers are provided, and the protrusion is fixedly disposed on a side surface of at least one of the dimming film layers and fixed to the bezel sidewalls via the fixing structure.

Optionally, one of the plurality of dimming film layers is a light guide plate, the protrusion includes: a first sub-protrusion fixedly disposed on a side surface of the light guide plate, and the fixing structure includes: an engaging slot formed in the bezel sidewalls, into which the first sub-protrusion is engaged.

Optionally, the engaging slot has a bottom wall opposite to the backplane and pressed on the first sub-protrusion.

Optionally, the plurality of dimming film layers includes: a light guide plate and an optical film located on a side of the light guide plate away from the backplane, the protrusion includes: a second sub-protrusion fixedly disposed on a side surface of the optical film and provided with a first positioning hole, each of the bezel sidewalls is provided with a limiting slot opening toward the optical film and into which the second sub-protrusion is extended, and a second positioning hole coaxially disposed and in communication with the first positioning hole, and the fixing structure includes: a positioning pin extending through the first positioning hole and the second positioning hole.

Optionally, each of the bezel sidewalls is further provided with a third positioning hole coaxial with the first positioning hole, the second positioning hole is located on a side of the first positioning hole away from the backplane, the third positioning hole is located on a side of the first positioning hole close to the backplane, and a part of the positioning pin is located in the third positioning hole.

Optionally, each of the bezel sidewalls include: a side plate and a support part disposed on the side plate, the side plates of the plurality of bezel sidewalls being disposed jointly around the backplane, the support part being configured to support a display panel and having the limiting slot and the second positioning hole disposed thereon, the backlight module further includes: an adhesive layer disposed on a surface of the support part away from the backplane, and an end of the positioning pin away from the backplane is located in the second positioning hole.

Optionally, a dimension of the positioning pin in a first direction is larger than a dimension of the positioning pin in a second direction, the first direction is a length direction of the bezel sidewall where the positioning pin is located, and the second direction is a width direction of the bezel sidewall where the positioning pin is located.

Optionally, the positioning pin includes: a pin body and a pin cap, the pin cap is located at an end of the pin body away from the backplane, the pin body has a strip orthographic projection on the backplane extending in the first direction, and the pin cap exceeds the pin body in the second direction.

Optionally, the pin cap is located at a middle of the pin body in the first direction.

Optionally, an end of the positioning pin away from the backplane is provided with a pin hole extending toward the backplane.

Optionally, the pin hole is a threaded hole.

Optionally, the display module further includes a connector, via which the backplane is connected to the bezel.

Optionally, the connector includes a screw.

Accordingly, in an embodiment of the present disclosure, there is further provided a display device, including: a display panel and a backlight module as described above.

Optionally, the display device is a stand-up display device, and the protrusion is disposed near a top of the display device.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure. In the drawings.

DETAILED DESCRIPTION OF THE EMBODIMENTS

Hereinafter, specific embodiments of the present disclosure will be described with respect to the accompanying drawings. It will be appreciated that the specific embodiments as set forth herein are merely for the purpose of illustration and explanation of the disclosure and should not be constructed as a limitation thereof. All other embodiments obtained by the ordinarily skilled in the art without paying any creative effort shall be included in the protection scope of the present disclosure.

The terminology used herein to describe embodiments of the disclosure is not intended to limit and/or define the scope of the disclosure. For example, unless otherwise defined, technical or scientific terms used in the present disclosure are intended to have general meanings as understood by those of ordinary skill in the art. It should be understood that the words "first", "second" and similar terms used in the present disclosure do not denote any order, quantity, or importance, but are used merely for distinguishing different components. The singular forms "a," "an," or "the" and similar referents do not denote a limitation of quantity, but rather denote the presence of at least one, unless the context clearly dictates otherwise.

A backlight module of a display device includes a light source and dimming layers such as a light guide plate and an optical film for adjusting light rays. For example, the light guide plate guides the light emitted from the light source so that the light from the light source is uniformly emitted from a light emitting surface of the light guide plate after propagating in the light guide plate; and the optical film may be a diffusion sheet that may further diffuse the light emitted from the light guide plate. If the light guide plate and the optical film are not fixed stably, inclination of the light guide plate, displacement of the optical film and other problems may occur during use and transportation of the display device, influencing the display effect. For example, the light guide plate in a large-sized stand-up display device is easily inclined to press the optical film and the display panel located at the light emitting side thereof, thereby causing screen abnormality. Since the optical film on the light emitting side of the light guide plate is relatively thin, a top end of the optical film is easy to slide downward when the display device is placed vertically, which may also lead to poor display.

Figure 1:
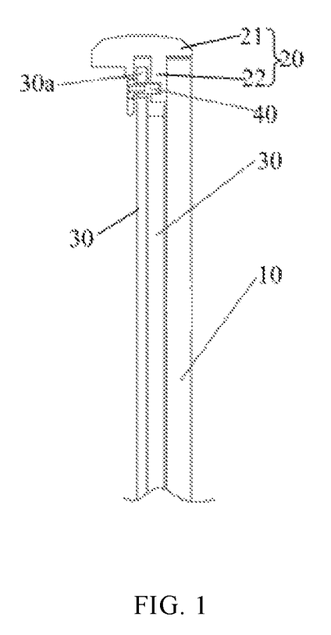
FIG. 1 is a sectional view of a backlight module provided in an embodiment of the disclosure.

As an aspect of the present disclosure, there is provided a backlight module. FIG. 1 is a sectional view of a backlight module provided in an embodiment of the disclosure. As shown in FIG. 1, the backlight module includes: a backplane 10, a bezel, a protrusion 30a and a plurality of dimming film layers 30.

The bezel is connected to the backplane 10, and in an embodiment, is in contact with the backplane 20.

The bezel includes: a fixing structure 40 and a plurality of bezel sidewalls 20 on which the fixing structure 40 is disposed. The plurality of bezel sidewalls 20 are connected end to end to form a frame-like structure. The plurality of bezel sidewalls 20 and the backplane 10 define an accommodation space in which the dimming film layers 30 are disposed. The protrusion 30a is fixedly disposed on a side surface of at least one of the dimming film layers 30. The fixing structure 40 has an orthographic projection on the backplane 10 located within an orthographic projection of the bezel sidewalls 20 on the backplane 10, and the protrusion 30a is fixed on the bezel sidewalls 20 via the fixing structure 40 so that the dimming film layers 30 and the bezel sidewalls 20 remain relatively fixed.

In an embodiment of the present disclosure, the dimming film layers 30 may include a light guide plate, or an optical film, such as a diffusion sheet or a prism sheet, disposed on a light emitting side of the light guide plate. Each of the dimming film layers 30 has a first surface facing the display panel, a second surface opposite to the first surface, and a side surface connected between the first surface and the second surface. The protrusion 30a may be disposed on a side surface of only one of the dimming film layers 30 and form an integral structure with the dimming film layer 30, or the protrusion 30a may include a plurality of different portions disposed on different dimming film layers 30, respectively.

In an embodiment of the present disclosure, the fixing structure 40 is disposed on the bezel sidewalls 20 and fixes the protrusion 30a on the bezel sidewalls 20 so that the position of the dimming film layers 30 on the backlight module remains fixed, thereby ensuring the display effect of the display device. Further, the orthographic projection of the fixing structure 40 on the backplane 10 is located within the orthographic projection of the bezel sidewalls 20 on the backplane 10, thereby contributing to a narrow bezel.

Figure 2:
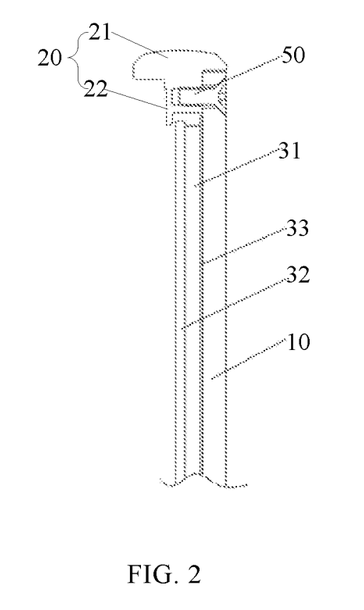
FIG. 2 is another sectional view of the backlight module provided in an embodiment of the disclosure.

In an embodiment of the present disclosure, the bezel may be a middle bezel of the display device and made of a material with relatively high hardness. The accommodation space formed by the plurality of bezel sidewalls 20 and the backplane 10 does not need to be provided with a plastic frame, so as to realize a narrower bezel. Each of the bezel sidewalls 20 may include a side plate 21 and a support part 22 disposed on the side plate 21, the side plates of the plurality of bezel sidewalls 20 are disposed 21 jointly around the backplane 10, and the support part 22 is located on a side of the backplane 10 facing the display panel and used for supporting the display panel. FIG. 2 is another sectional view of the backlight module provided in an embodiment of the disclosure. It should be understood that FIG. 2 and FIG. 1 are sectional views obtained by cutting the display module from different positions. Referring to FIGS. 1 and 2, the backplane 10 may be specifically connected to the support part 22 via a connector 50, and the fixing structure 40 is disposed on the support part 22. In FIG. 2, the connector 50 is a screw, but obviously, the connector 50 may also be an adhesive layer such as a double-sided tape or glue. The plurality of dimming layers 30 in the accommodation space may include: a light guide plate 31 and an optical film 32 located on a side of the light guide plate 31 away from the backplane.

Figure 3:
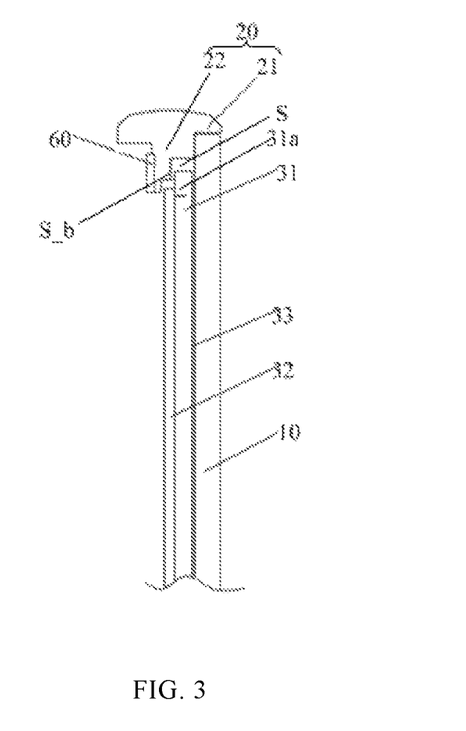
FIG. 3 is another sectional view of the backlight module provided in an embodiment of the disclosure.
Figure 4:
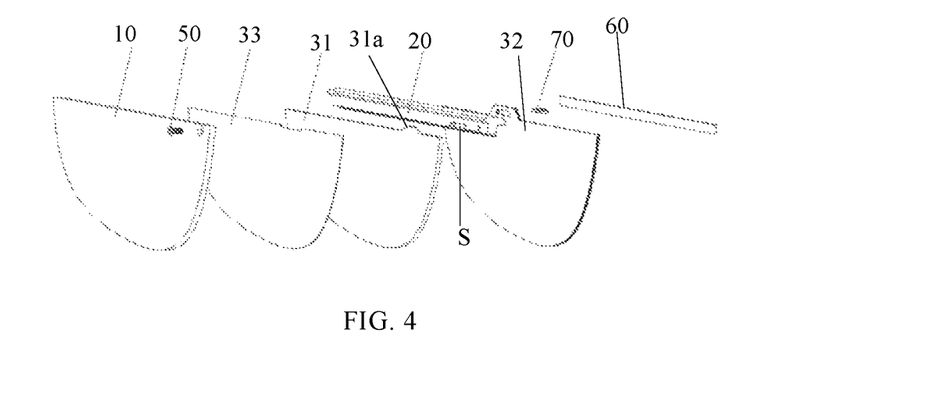
FIG. 4 is an exploded view of a backlight module provided in an embodiment of the disclosure.

In an embodiment, one of the plurality of dimming layers 30 is a light guide plate 31. FIG. 3 is another sectional view of the backlight module provided in an embodiment of the disclosure, and FIG. 4 is an exploded view of a backlight module provided in an embodiment of the disclosure. As shown in FIGS. 3 and 4, the protrusion includes a first sub-protrusion 31a fixedly disposed on a side surface of the light guide plate 31. The first sub-protrusion 31a forms an integral structure with the light guide plate 31. It should be noted that the sectional view shown in FIG. 3 is obtained by cutting the backlight module from the position of the first sub-protrusion 31a. The fixing structure 40 includes: an engaging slot S formed in the bezel sidewalls 20, into which the first sub-protrusion 31a is engaged.

The engaging slot S may have a shape matched with that of the first sub-protrusion 31a. For example, an orthographic projection of the engaging slot S on the backplane 10 is the same as an orthographic projection of the first sub-protrusion 31a on the backplane 10 in shape and size so that the first sub-protrusion 31a may be engaged into the engaging slot S.

In an embodiment, the engaging slot S has a bottom wall S_b opposite to the backplane 10, which is pressed on the first sub-protrusion 31a to fix the first sub-protrusion 31a in the engaging slot S. When the display device where the backlight module is located is in a stand-up state, the light guide plate 31 can be prevented from toppling over under the pressing of the bottom wall S_b of the engaging slot S.

A reflective sheet 33 is disposed between the light guide plate 31 and the backplane 10 to reflect light from an inside of the light guide plate 31 back to the light guide plate 31. In general, the reflective sheet 33 is thin and light, and thus, when the first sub-protrusion 31a is pressed by the bottom wall S_b of the engaging slot S, the reflective sheet 33 is also pressed by the light guide plate 31 on the backplane 10. Thus, no additional structure for fixing the reflective sheet 33 is needed.

Figure 5:
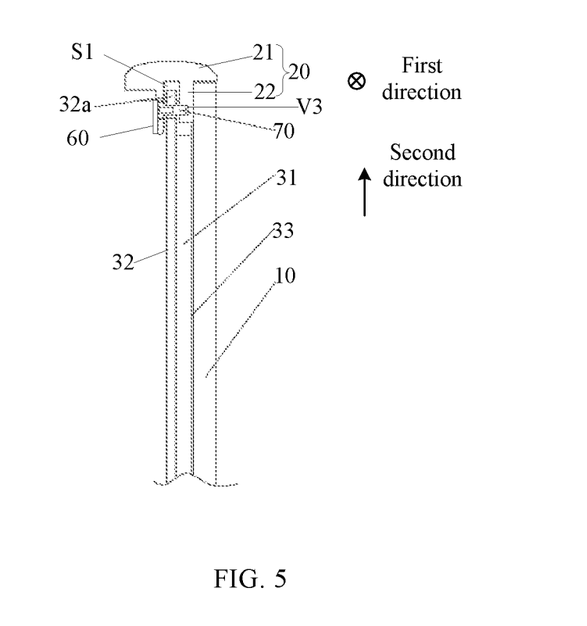
FIG. 5 is another sectional view of the backlight module provided in an embodiment of the disclosure.
Figure 6:
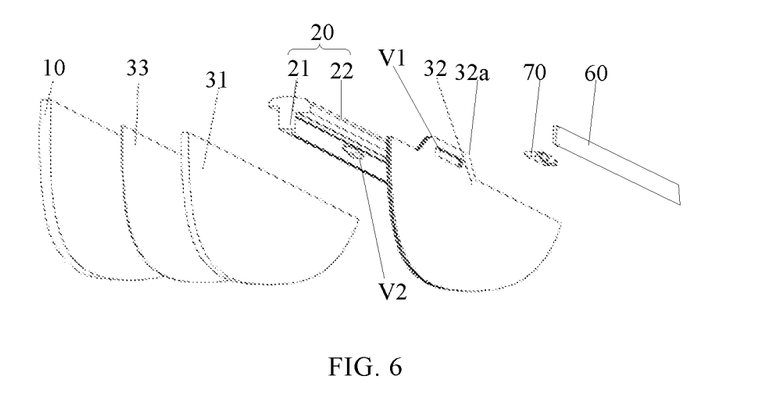
FIG. 6 is another exploded view of the backlight module provided in an embodiment of the disclosure.

FIG. 5 is another sectional view of the backlight module provided in an embodiment of the disclosure. As shown in FIG. 5, in an embodiment, the protrusion includes a second sub-protrusion 32a that is fixedly disposed on a side surface 32 of the optical film 32 and may form an integral structure with the optical film 32. It should be noted that the sectional view shown in FIG. 5 is obtained by cutting the backlight module from the position of the second sub-protrusion 32a. FIG. 6 is another exploded view of the backlight module provided in an embodiment of the disclosure. As shown in FIGS. 5 and 6, the second sub-protrusion 32a is provided with a first positioning hole V1, and each of the bezel sidewalls 20 is provided with a limiting slot 51 opening toward the optical film 32 and into which the second sub-protrusion 32a is extended, and a second positioning hole V2 coaxially disposed and in communication with the first positioning hole V1. The fixing structure includes: a positioning pin 70 extending through the first positioning hole V1 and the second positioning hole V2. By positioning with the positioning pin 70, the optical film 32 can be prevented from shaking in the accommodation space; meanwhile, the positioning pin 70 may also serve as a fool-proof structure to prevent positional deviations when the optical film 32 is manually assembled. For a stand-up display device, the second sub-protrusion 32a may be disposed at a top position of the optical film 32 so that the optical film 32 is prevented from slipping off during use of the stand-up display device due to the positioning of the positioning pin 70.

Specifically, the limiting slot Si and the second limiting hole V2 are disposed on the support part 22 of the bezel sidewalls 20, the support part 22 is further provided with a third positioning hole V3, the second positioning hole V2 is located on a side of the limiting slot Si away from the backplane 10, the third positioning hole V3 is located on a side of the limiting slot Si close to the backplane 10, and one part of the positioning pin 70 is located in the third positioning hole V3 while the other part extends through the first positioning hole V1 and the second positioning hole V2. The third positioning hole V3 may be a blind hole.

In an embodiment, as shown in FIGS. 5 and 6, an end of the positioning pin 70 away from the backplane 10 is located in the second positioning hole V2. The backlight module further includes an adhesive layer 60 disposed on a surface of the support part 22 away from the backplane 10. The adhesive layer 60 is configured to bond the display panel and prevent the positioning pin 70 from being released from the support part 22.

In an embodiment, a dimension of the positioning pin 70 in a first direction is larger than a dimension of the positioning pin 70 in a second direction. The first direction is a length direction of the bezel sidewall 20 where the positioning pin 70 is located, such as an inward or outward direction perpendicular to the paper in FIG. 5. The second direction is a width direction of the bezel sidewall 20 where the positioning pin 70 is located, such as the upward or downward direction in FIG. 5. The positioning pin 70 with a larger size in the first direction can improve the stable fixing of the optical film 32, while the positioning pin 70 with a smaller size in the second direction can correspondingly reduce sizes of the first positioning hole V1 and the third positioning hole V3 in the second direction, thereby reducing the influence of the first positioning hole V1 and the second positioning hole V2 on the hardness of the bezel sidewall 20.

It may be understood that a plurality of second sub-protrusions 32a may be provided on a plurality of side surfaces of the optical film 32, respectively, and each of the bezel sidewalls 20 adjacent to each of the second sub-protrusions 32a is provided with a positioning pin 70. In this case, the first directions corresponding to the positioning pins 70 on different bezel sidewalls 20 are not identical, and the second directions corresponding to the positioning pins 70 on different bezel sidewalls 20 are not identical.

Figure 7A:
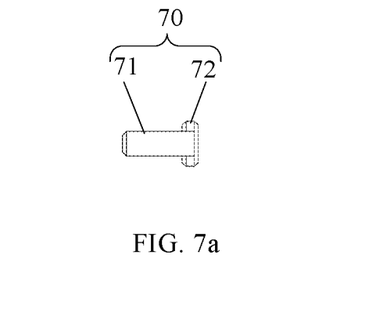
FIG. 7*a* is a side view of a positioning pin provided in an embodiment of the disclosure.
Figure 7B:
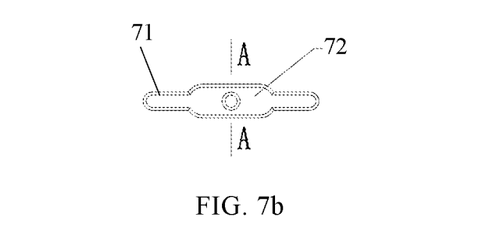
FIG. 7*b* is a front view of a positioning pin provided in an embodiment of the disclosure.
Figure 7C:
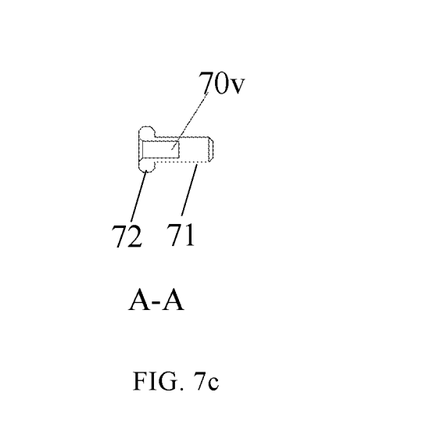
FIG. 7c is a sectional view taken along line A-A in FIG. 7b.
Figure 7D:
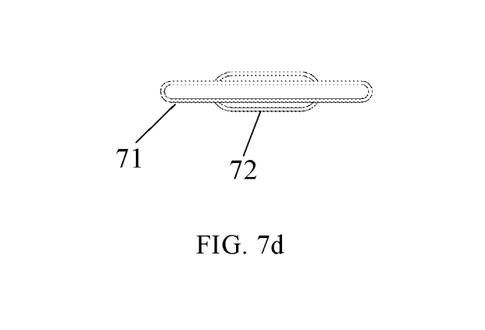
FIG. 7d is a rear view of a positioning pin provided in an embodiment of the disclosure.
Figure 7E:
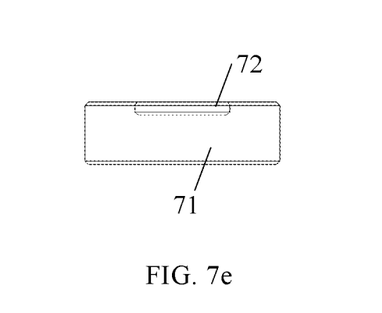
FIG. 7e is a bottom view of a positioning pin provided in an embodiment of the disclosure.
Figure 7F:
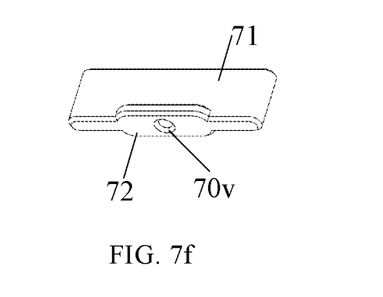
FIG. 7f is a perspective view of a positioning pin provided in an embodiment of the disclosure.

FIG. 7a is a side view of a positioning pin provided in an embodiment of the disclosure, FIG. 7b is a front view of a positioning pin provided in an embodiment of the disclosure, FIG. 7c is a sectional view taken along line A-A in FIG. 7b, FIG. 7d is a rear view of a positioning pin provided in an embodiment of the disclosure, FIG. 7e is a bottom view of a positioning pin provided in an embodiment of the disclosure, and FIG. 7f is a perspective view of a positioning pin provided in an embodiment of the disclosure. As shown in FIGS. 5 to 7f, the positioning pin 70 may include: a pin body 71 and a pin cap 72, the pin cap 72 is located at an end of the pin body 71 away from the backplane 10, the pin body 71 has a strip orthographic projection on the backplane 10 extending in the first direction, and the pin cap 72 exceeds the pin body 71 in the second direction. Specifically, the pin cap 72 may be located at a middle of the pin body 71 in the first direction. By providing the pin cap 72, the pin cap 72 may be sucked by a suction cup during detaching of the positioning pin 70, thereby taking out the positioning pin 70.

An orthographic projection of the first positioning hole V1 on the backplane 10 may be matched with an orthographic projection of the positioning pin 70 on the backplane 10 so that the pin cap 72 of the positioning pin 70 may be fixed in the first positioning hole V1, and orthographic projections of the second positioning hole V2 and the third positioning hole V3 on the backplane 10 may be each matched with an orthographic projection of the pin body 71 on the backplane 10 so that the pin body 72 of the positioning pin 70 may be arranged in the second positioning hole V2 and the third positioning hole V3.

Further, one end of the positioning pin 70 away from the backplane 10 is provided with a pin hole 70v that extends toward the backplane 10, where the pin hole 70v may be a threaded hole. When the pin body 71 is deformed and makes it difficult to separate the positioning pin 70 from the bezel sidewalls 20, a tapping screw may be screwed into the pin hole and then the positioning pin 70 is pulled out by a tool such as a pincer or tweezers.

It should be noted that in the backlight module provided in the embodiments of the present disclosure, the protrusion may include both the first sub-protrusion 31a and the second sub-protrusion 32a, and an orthographic projection of the first sub-protrusion 31a on the backplane 10 is spaced from an orthographic projection of the second sub-protrusion 32a on the backplane 10 so that the engaging slot S for fixing the first sub-protrusion 31a and the positioning pin 70 for fixing the second sub-protrusion 32a are located at different positions. In addition, one or more first sub-protrusions 31a may be disposed on the same side of the light guide plate 31, and one or more second sub-protrusions 32a may be disposed on the same side of the optical film 32.

In the backlight module provided by the embodiments of the present disclosure, the first sub-protrusion 31a is fixedly disposed on a side surface of the light guide plate 31 and fixed in the engaging slot S of the bezel sidewalls 20, while the bottom wall of the engaging slot S is pressed on the first sub-protrusion 31a, so as to prevent the light guide plate 31 from tilting when the backlight module is in a stand-up state; and the second sub-protrusion 32a is fixedly disposed on a side surface of the optical film 32 and extends into the limiting slot Si, while the limiting pin passes through the first limiting hole V1 on the second sub-protrusion 32a and the second limiting hole V2 on the bezel sidewalls 20, so as to fix the optical film 32 and prevent the optical film 32 from sliding down when the backlight module is in a stand-up state. The backlight module in the embodiments of the disclosure has a simple structure, and can realize a narrow bezel.

Figure 8:
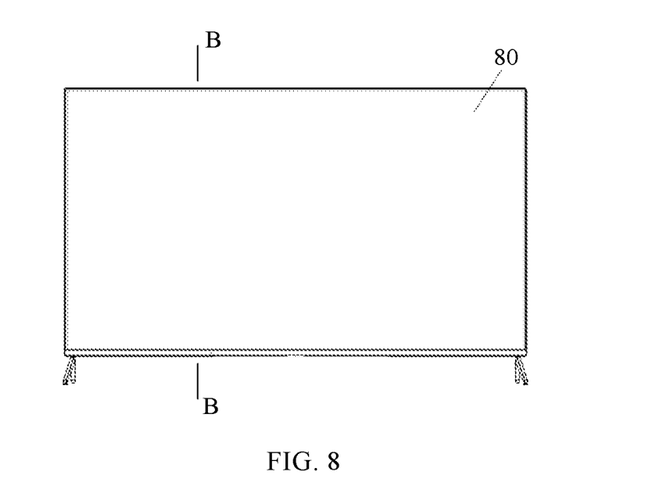
FIG. 8 is a front view of a display device provided in an embodiment of the disclosure.
Figure 9:
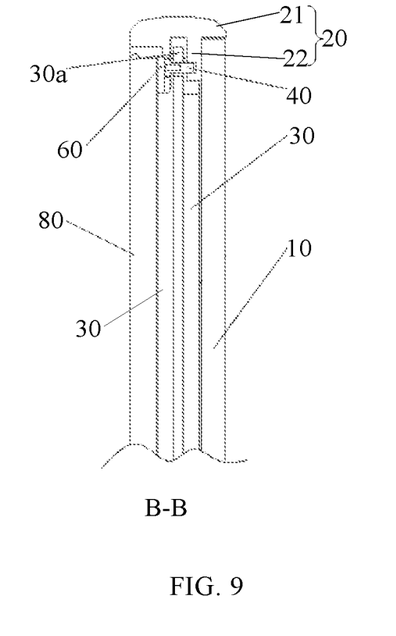
FIG. 9 is a partial sectional view taken along line B-B of FIG. 8.

As another aspect of the present disclosure, there is provided a display device. FIG. 8 is a front view of a display device provided in an embodiment of the disclosure, and FIG. 9 is a partial sectional view taken along line B-B of FIG. 8. FIG. 8 takes the display device being a television as an example for illustration, but it can be understood that the display device provided by the embodiments of the present disclosure is not limited to the television shown in FIG. 8. As shown in FIGS. 8 and 9, the display device includes a display panel 80 and the backlight module provided in the above embodiments. The display panel 80 is a liquid crystal display panel supported on the support part 22 of the bezel sidewalls 20 and fixedly connected to the support part 22 via the adhesive layer 60.

In an embodiment, the display device is a stand-up display device, which means that the display device is in a stand-up state during normal use, for example, the display device is a television. In this case, the protrusion 30a in FIG. 1 is disposed at a position near the top of the display device.

Obviously, in another embodiment, the protrusion may be provided at other positions of the display device, for example, the protrusion portions 30a may be disposed at positions close to the left and right edges of the stand-up display device. Also, to facilitate assembly of the display device, the protrusion 30a may be provided only at a position near the top of the display device.

The assembling process of the display device will be described with reference to FIGS. 2 to 8 below, in which the protrusion 30a includes: the first sub-protrusion 31a fixedly disposed on a side surface of the light guide plate 31 and the second sub-protrusion 32a disposed on a side surface of the optical film 32, and the assembling process of the display device includes the following steps I to V.

At step I, the backplane 10 is fixedly connected to the bezel. Specifically, the backplane 10 is fixedly connected to a support part 22 of the bezel sidewalls 20 via a connector 50, where the connector 50 may be a screw, an adhesive layer, or the like. The backplane 10 and a plurality of bezel sidewalls 20 of the bezel define an accommodation space.

At step II, a reflective sheet 33 is stacked on a surface of the backplane 10 facing the accommodation space, the light guide plate 31 is then stacked on the reflective sheet 33, while the first sub-protrusion 31a on the side surface of the light guide plate 31 is inserted into the corresponding engaging slot S so that the bottom wall S_b of the engaging slot S is pressed on the first sub-protrusion 31a.

At step III, the optical film 32 is stacked on the light guide plate 31, while the second sub-protrusion 32a on the side surface of the optical film 32 extends into the corresponding limiting slot S 1.

At step IV, the limiting pin 70 is inserted into the first limiting hole V1, the second limiting hole V2 and the third limiting hole V3 that are in communication, so as to fix the optical film 32 to the bezel.

At step V, an adhesive layer 60 is provided on a surface of the support part 22 away from the backplane 10, and the display panel 80 is fixed on the adhesive layer 60.

In the display device provided by the embodiments of the disclosure, since the light guide plate and the optical film in the backlight module can remain fixed with the bezel, problems such as abnormal pictures and the like caused by inclination of the light guide plate or sliding of the optical film can be prevented, and the backlight module has a simple structure and is convenient to assemble.

It will be appreciated that the above implementations are merely exemplary implementations for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A backlight module, comprising: a backplane, a bezel, a protrusion and a plurality of dimming film layers, wherein the bezel is connected to the backplane and comprises: a fixing structure and a plurality of bezel sidewalls on which the fixing structure is disposed, the fixing structure has an orthographic projection on the backplane located within an orthographic projection of the bezel sidewalls on the backplane, the plurality of bezel sidewalls and the backplane define an accommodation space in which the dimming film layers are provided, and the protrusion is fixedly disposed on a side surface of at least one of the dimming film layers and fixed to the bezel sidewalls via the fixing structure, wherein one of the plurality of dimming film layers is a light guide plate, the protrusion comprises: a first sub-protrusion fixedly disposed on a side surface of the light guide plate, and the fixing structure comprises: an engaging slot formed in the bezel sidewalls, into which the first sub-protrusion is engaged, wherein the engaging slot has a bottom wall opposite to the backplane and pressed on the first sub-protrusion, and wherein the engaging slot is concave from a surface of the bezel sidewalls opposite to the backplane and does not penetrate the bezel sidewalls, and is configured to be suitable for inserting the first sub-protrusion into the engaging slot when installing the light guide plate.

2. The backlight module according to claim 1, wherein the display module further comprises a connector, via which the backplane is connected to the bezel.

3. The backlight module according to claim 2, wherein the connector comprises a screw.

4. A display device, comprising: a display panel and a backlight module as claimed in claim 1.

5. The display device according to claim 4, wherein the display device is a stand-up display device, and the protrusion is disposed near a top of the display device.

6. The backlight module according to claim 1, wherein the plurality of dimming film layers comprises: a light guide plate and an optical film located on a side of the light guide plate away from the backplane, the protrusion comprises: a second sub-protrusion fixedly disposed on a side surface of the optical film and provided with a first positioning hole, each of the bezel sidewalls is provided with a limiting slot opening toward the optical film and into which the second sub-protrusion is extended, and a second positioning hole coaxially disposed and in communication with the first positioning hole, and the fixing structure comprises: a positioning pin extending through the first positioning hole and the second positioning hole.

7. The backlight module according to claim 6, wherein each of the bezel sidewalls is further provided with a third positioning hole coaxial with the first positioning hole, the second positioning hole is located on a side of the first positioning hole away from the backplane, the third positioning hole is located on a side of the first positioning hole close to the backplane, and a part of the positioning pin is located in the third positioning hole.

8. The backlight module according to claim 6, wherein each of the bezel sidewalls comprise: a side plate and a support part disposed on the side plate, the side plates of the plurality of bezel sidewalls being disposed jointly around the backplane, the support part being configured to support a display panel and having the limiting slot and the second positioning hole disposed thereon, the backlight module further comprises: an adhesive layer disposed on a surface of the support part away from the backplane, and an end of the positioning pin away from the backplane is located in the second positioning hole.

9. The backlight module according to claim 6, wherein a dimension of the positioning pin in a first direction is larger than a dimension of the positioning pin in a second direction, the first direction is a length direction of the bezel sidewall where the positioning pin is located, and the second direction is a width direction of the bezel sidewall where the positioning pin is located.

10. The backlight module according to claim 9, wherein the positioning pin comprises: a pin body and a pin cap, the pin cap is located at an end of the pin body away from the backplane, the pin body has a strip orthographic projection on the backplane extending in the first direction, and the pin cap exceeds the pin body in the second direction.

11. The backlight module according to claim 10, wherein the pin cap is located at a middle of the pin body in the first direction.

12. The backlight module according to claim 6, wherein an end of the positioning pin away from the backplane is provided with a pin hole extending toward the backplane.

13. The backlight module according to claim 12, wherein the pin hole is a threaded hole.

\* \* \* \* \*